United States Patent [19]

Sakakibara et al.

[11] Patent Number: 5,257,188
[45] Date of Patent: Oct. 26, 1993

[54] ENGINE BRAKE CONTROL OF CONTINUOUS VARIABLE TRANSMISSION RESPONSIVE TO VEHICLE BRAKE

[75] Inventors: Shiro Sakakibara; Kazuo Kamiya, both of Anjo, Japan

[73] Assignee: Aisin AW Co., Ltd., Japan

[21] Appl. No.: 633,357

[22] Filed: Dec. 28, 1990

[30] Foreign Application Priority Data

Dec. 29, 1989 [JP] Japan .................. 1-343895

[51] Int. Cl.⁵ ............................. B60K 41/22
[52] U.S. Cl. .................................. 364/424.1
[58] Field of Search ............... 364/424.1; 74/865–867, 74/870, 871

[56] References Cited

U.S. PATENT DOCUMENTS

| | | | |
|---|---|---|---|
| 4,750,598 | 6/1988 | Danno et al. | 74/857 X |
| 4,803,899 | 2/1989 | Kumura | 74/866 |
| 4,941,371 | 7/1990 | Koyama et al. | 74/865 |
| 5,012,696 | 5/1991 | Miyawaki | 74/866 |
| 5,025,686 | 6/1991 | Sato et al. | 74/866 |
| 5,031,100 | 7/1991 | Takahashi | 364/424.1 |
| 5,040,114 | 8/1991 | Ishikawa et al. | 364/424.1 |
| 5,085,104 | 2/1992 | Kouno et al. | 74/866 |

Primary Examiner—Thomas G. Black
Assistant Examiner—Thomas S. Auchterlonie
Attorney, Agent, or Firm—Lorusso & Loud

[57] ABSTRACT

Herein disclosed is a control system to be used in a continuously variable transmission for a vehicle for continuously varying and transmitting the revolutions of an engine to the wheels. The control system comprises: a vehicle speed detector for detecting the running speed of a vehicle; a speed demand change detector for detecting a signal corresponding to the speed demand change by the driver; a setting device for setting the target speed of the vehicle to a predetermined value when the vehicle speed is higher than a preset value and the speed demand change is lower than a preset value; and a torque ratio controller for controlling the torque ratio between the input shaft and output shaft of the continuously variable transmission in accordance with the predetermined value of the target vehicle speed.

2 Claims, 16 Drawing Sheets

θ = Throttle Opening
Vp = Present Vehicle Speed
Vc = Target Vehicle Speed
A, B = Preset Values
F = Engine Brake Mode Flag
α = Engine Brake Demand
β = Brake Mode Decision Coefficient
$\dot{V}$ = Vehicle Acceleration
V = Vehicle Speed
n = Count θ = Throttle Opening
α = Engine Brake Demand
V̇ = Vehicle Acceleration β = Brake Mode Decision
V = Vehicle Speed

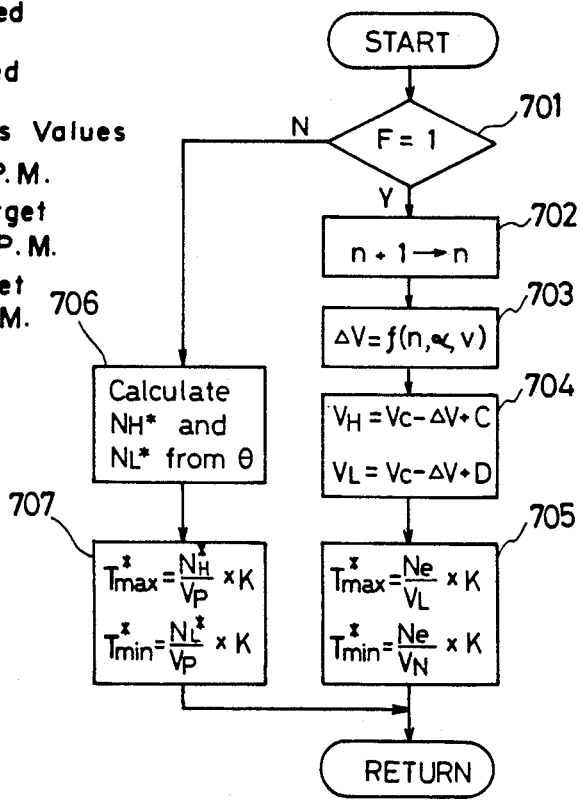

Θ = Throttle Opening
Vp = Present Vehicle Speed
Vc = Target Vehicle Speed
F = Engine Brake Mode Flag
n = Count
ΔV = Engine Brake Control Value
α = Set Deceleration Rate
$V_H$ = Upper Speed Limit
$V_L$ = Lower Speed Limit
C, D = Hysteresis Values
Ne = Engine R.P.M.
$N_H^*$ = Upper Target Engine R.P.M.
$N_L^*$ = Lower Target Engine R.P.M.
$T_{max}^*$ = Upper Torque Ratio Limit
$T_{min}^*$ = Lower Torque Ratio Limit
K = Coefficient for Calculating R.P.M. From Vehicle Speed

Fig. 9

V = Vehicle Speed
ΔV = Engine Brake Control Value
γ = Set Deceleration Rate
n = Count ΔV = Engine Brake Control Value
Vc = Target Vehicle Speed Vp = Present Vehicle Speed
ė = Target Shifting Speed
MVP = Actual Motor R.P.M.
MVTGT = Target Motor R.P.M.

ENGINE BRAKE CONTROL OF CONTINUOUS VARIABLE TRANSMISSION RESPONSIVE TO VEHICLE BRAKE

BACKGROUND OF THE INVENTION

1. Field of the Invention

The present invention relates to a control system of a continuously variable transmission for a vehicle and, more particularly, to engine braking control.

2. Description of the Prior Art

In a continuously variable transmission for a vehicle to continuously vary and transmit the revolutions of an engine to the wheels, there is known a control system for controlling the speed of a running vehicle by employing engine braking to adjust the speed ratio of the input shaft and output shaft of the continuously variable transmission, as disclosed for example, in Japanese Patent Laid-Open No. 59-219557. In this known control system, the target speed of the engine while braking, is stored so that the speed ratio of the continuously variable transmission may be adjusted to equalize the target speed and the actual speed of the vehicle during engine braking.

In the conventional control system of a continuously variable transmission for a vehicle, however, the transmission initiates the engine braking mode if the throttle opening is lower than a preset value and if the vehicle speed is higher than a preset value. This makes it difficult to enter the engine braking mode after the vehicle coasts down a long hill in that deceleration cannot be established as demanded by the driver.

SUMMARY OF THE INVENTION

The present invention solves the problems mentioned above by providing a control system for a continuously variable transmission for a vehicle, which can shift the transmission from a running mode during a coasting acceleration, to an engine braking mode, according to the desire of a driver.

Accordingly, the present invention provides, in a continuously variable transmission of a vehicle able to continuously vary and transmit the revolutions of an engine to the wheels, a control system which comprises: vehicle speed detecting means for detecting the running speed of a vehicle; speed demand change detecting means for detecting a signal corresponding to a speed demand change from a driver; means for setting the target speed of the vehicle to a predetermined value in case the vehicle speed is higher than a preset value and the speed demand change is lower than a preset value; and torque ratio control means for controlling the torque ratio between the input shaft and output shaft of the continuously variable transmission in accordance with the predetermined value of the target vehicle speed.

In the present invention, in the case where the vehicle speed is higher than the preset value and the speed demand change is lower than the preset value, the target speed of the vehicle is set to the predetermined value so that the torque ratio of the input shaft and output shaft of the continuously variable transmission is controlled according to the predetermined value of the target vehicle speed. As a result, the running mode can be shifted from a coasting acceleration to an engine braking mode according to the desire of the driver.

BRIEF DESCRIPTION OF THE DRAWINGS

Other objects, features and advantages of the present invention will become apparent from the following description to be made with reference to the accompanying drawings, in which:

FIG. 9 is a flow chart showing the calculations of the upper and lower limits of a target torque ratio;

DESCRIPTION OF THE PREFERRED EMBODIMENTS

The present invention will be described in the following, in connection with the embodiments thereof, and with reference to the accompanying drawings.

Figure 1:
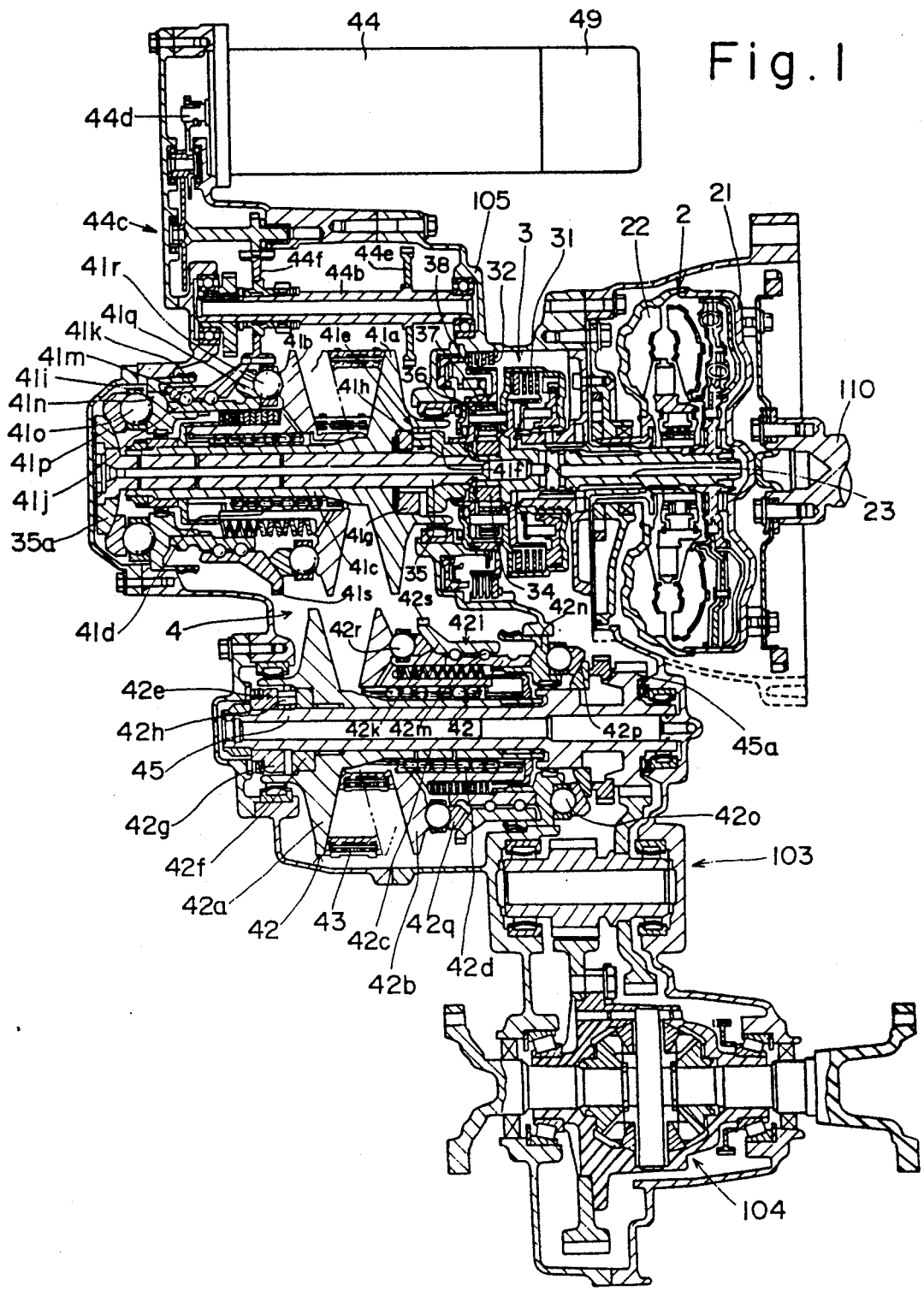
FIG. 1 is a section showing one example of a V-belt type continuously variable transmission to which the present invention is applied.
Figure 2A:
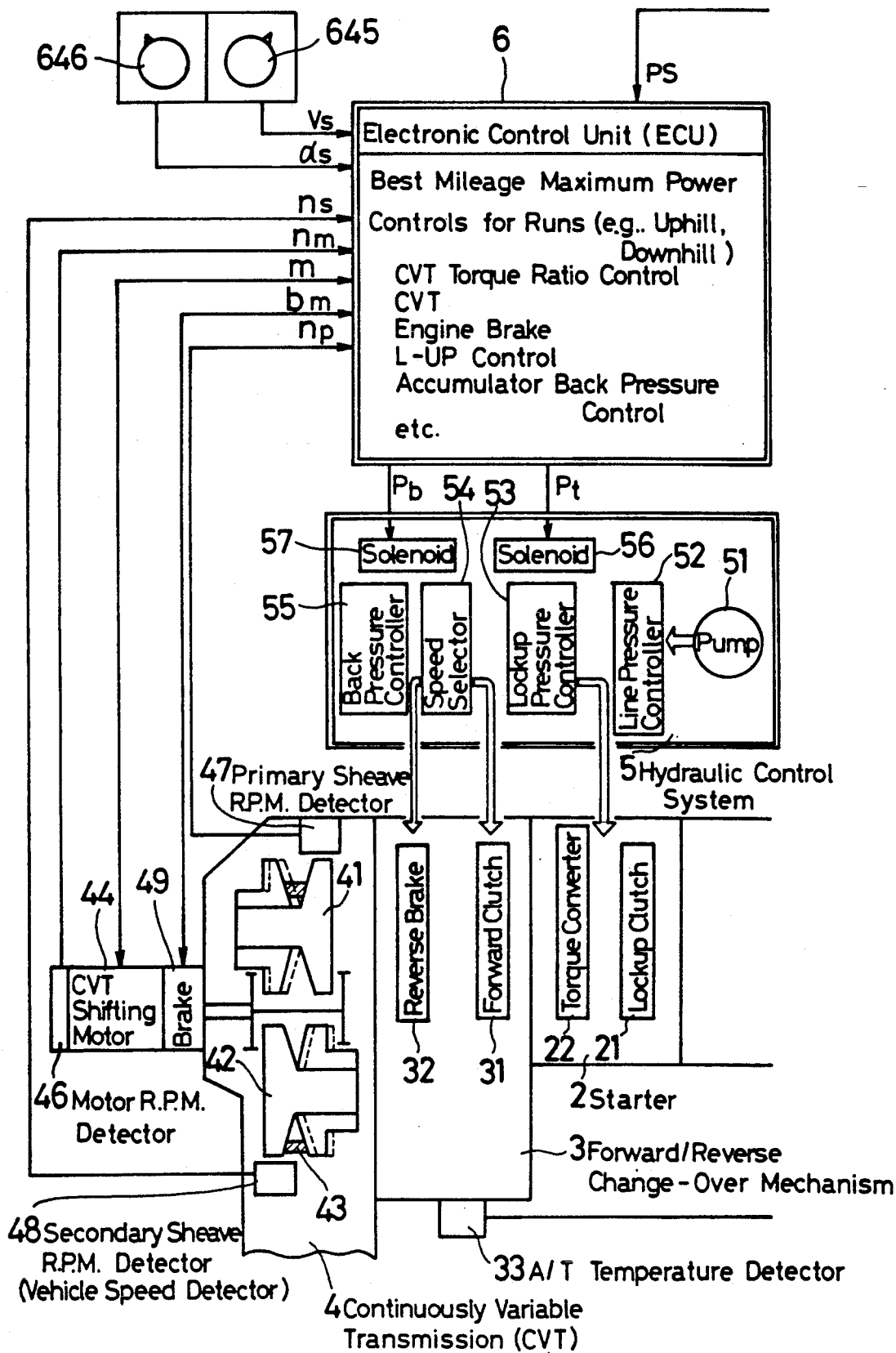
FIGS. 2(a) and 2(b) are a diagram showing the structure of one embodiment of the control system of the continuously variable transmission for a vehicle according to the present invention.
Figure 2B:
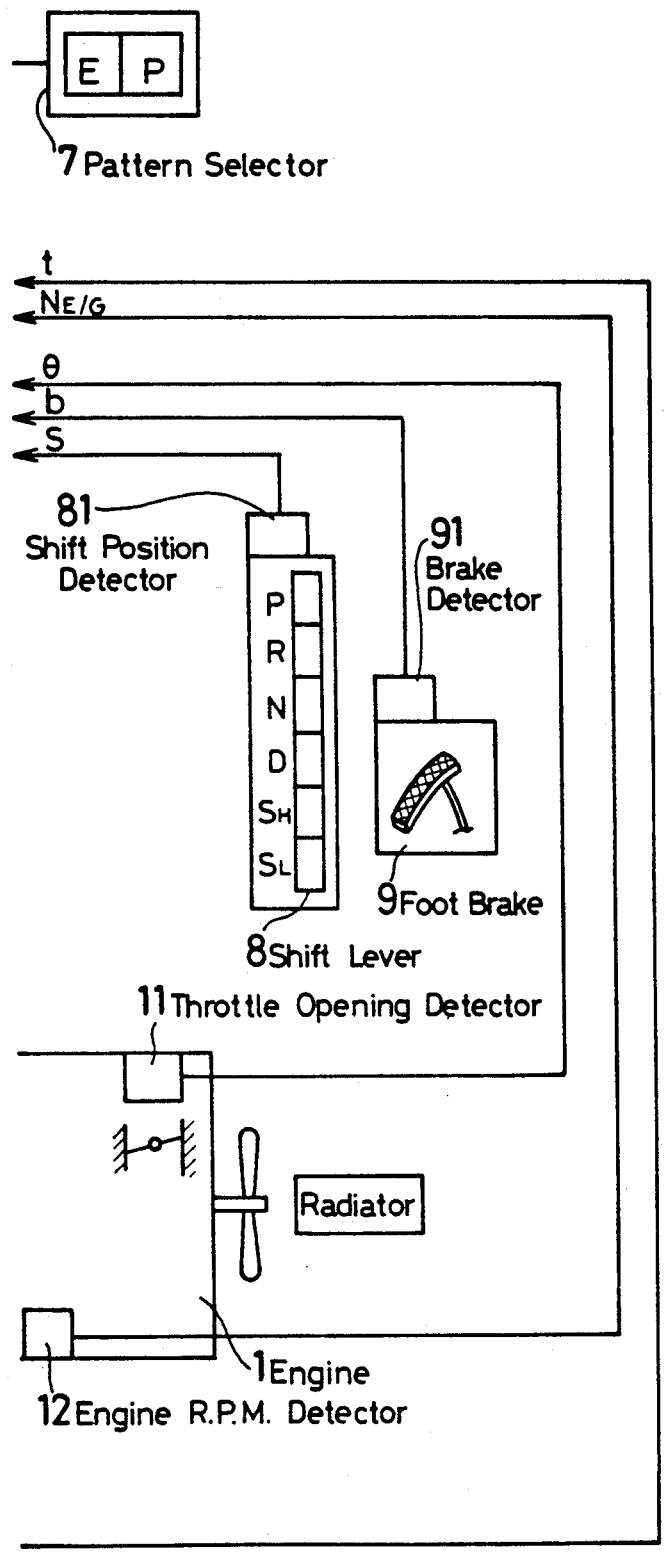

FIG. 1 is a section showing one example of a V-belt type continuously variable transmission (i.e., CVT) which is equipped with a torque converter and to which one embodiment of the present invention is applied, and FIG. 2 is a diagram showing the structure of the system of this embodiment. In these Figures: reference numeral 1 designates an engine; numeral 2 a starter; numeral 3 a forward/reverse change-over mechanism; numeral 4 a V-belt type continuously variable transmission; numeral 6 a hydraulic control system; numeral 6 an electronic control unit; numeral 7 a pattern selector; numeral 8 a shift lever; and numeral 9 a brake.

As shown in FIGS. 1 and 2, there is connected to the engine 1 the starter 2, to which the V-belt type continuously variable transmission (CVT) 4 is connected through the forward/reverse change-over mechanism 3. The V-belt type continuously variable transmission 4 is further connected through a counter gear mechanism 103 to a differential gear mechanism 104.

The engine 1 is arranged with a throttle opening detector 11 and an engine r.p.m. detector 12, which are individually connected to the electronic control unit 5. Thus, the throttle opening detector 11 and the engine r.p.m. detector 12 output a throttle opening signal $\theta$ and an engine r.p.m. ne, respectively, to the electronic control unit 6.

The starter 2 is composed of a torque converter 22 which is equipped with a lockup clutch 21. The torque converter 22 has its pump side connected to the output shaft 110 of the engine 1 and its turbine side connected with the output shaft 23 of the torque converter 22. This output shaft 23 acts as the input shaft of the forward-/reverse change-over mechanism 3. The lockup clutch 21 and torque converter 22 are controlled together by the hydraulic control system 5.

The forward/reverse change-over mechanism 3 is composed of: a sun gear 34 mounted on the output shaft 23, a carrier 36 connected to the primary shaft 35 of the forward/reverse change-over mechanism 3; a double pinion gear 37 supported by the carrier 36; and a ring gear 38 arranged to surround the double pinion gear 37. The change-over mechanism is further equipped with a forward clutch 31, which is interposed between the torque converter output shaft 23 and the carrier 36, and a reverse brake 32 which is interposed between the ring gear 38 and a transmission casing 106. Moreover, the forward clutch 31 and reverse brake 32 are individually controlled by the hydraulic control system 5 to change the forward and reverse running stages.

The forward/reverse change-over mechanism 3 is further equipped with an automatic transmission (A/T) oil temperature detector 33. This A/T temperature detector 33 is also connected with the electronic control unit 6 to output an oil temperature signal t of the working oil in the automatic transmission, to the electronic control unit 6.

The V-belt type continuously variable transmission 4 is equipped with a primary sheave 41, a secondary sheave 42 and a V-belt 43 made to run on the two sheaves 41 and 42. The primary sheave 41 is composed of a stationary sheave 41a and a movable sheave 41b, stationary sheave 41a is supported on primary shaft 35 rotatably and axially slidable relative thereto and the latter sheave 41b is supported on the cylindrical portion 41c of the stationary sheave 41a through a ball spline mechanism 41d in the axial direction only. Likewise, the secondary sheave 42 is composed of a stationary sheave 42a and a movable sheave 42b, stationary sheave 42a is supported by the output shaft 45 of the continuously variable transmission 4, rotatably and axially slidable relative to the output shaft 45 and movable sheave 42b is supported on the cylindrical portion 42c of the stationary sheave 42a through a ball spline mechanism 42d movable in the axial direction only.

In the primary sheave 41, a pressure regulating cam mechanism 41e is interposed between the carrier 36, the primary shaft 36 and the stationary sheave 41a. The pressure regulating mechanism 41e is composed of input and output side cams 41f and 41g, respectively having their opposed faces corrugated, and a roller interposed between the opposed faces of those two cams 41f and 41g. The input side cam 41f is splined to the carrier 36 and screwed to the primary shaft 36. On the other hand, the output side cam 41g is splined to the stationary sheave 41a and abuts against the back face of the stationary sheave 41a through a spring at its face opposite the face contacting roller 41h.

At the back of the movable sheave 41b, on the other hand, there is arranged a ball screw device 41i, which is composed of an externally threaded portion 41j, an internally threaded portion 41k and a number of balls 41m, and so on, - - -, and so on interposed between threaded portions 41j and 41k. The externally threaded portion 41j is supported through an adjusting member 41n, a bearing 41o and an automatic centering mechanism 41p on a flange portion 35a which is formed at the end of the primary shaft 35. If the adjusting member 41n is turned to rotate the externally threaded portion 41j relative to the internally threaded portion 41k, the initial tension of the belt 43 at the primary sheave 41 and the widthwise center of the running motion of the belt are adjusted. Moreover, the internally threaded portion 41k is supported on the back of the movable sheave 41b through an automatic centering mechanism 41q and a bearing 41r.

As a result, the transmission torque delivered from the carrier 36 and the primary shaft 35 to the input side cam 41f is converted by the pressure regulating cam mechanism 41e into an axial force according to the magnitude of the transmission torque, and the axial force is applied from the output side cam 41g to the stationary sheave 41a. The reaction of this axial force is transmitted from the input side cam 41f to the movable sheave 41b through the primary shaft 35, the flange portion 35a, the automatic centering mechanism 41p, the bearing 41o, the adjusting member 41n, the externally threaded portion 41j of the ball screw device 41i, the internally threaded portion 41k of the ball screw device 41i, the automatic centering mechanism 41q and the bearing 41r. The axial forces thus applied to stationary sheave 41a and the movable sheave 41b coact as a force for clamping the belt 43, and this clamping force of the belt 43 has a magnitude according to the transmission torque inputted from the carrier 36. On the other hand, the transmission torque coming from the carrier 36 is transmitted through the pressure regulating cam mechanism 41e to the primary sheave 41 and further from the V-belt 43 to the secondary sheave 42.

Moreover, the internally threaded portion 41k has its one end formed in its outer circumference with a gear 41s which meshes with a gear 44c formed on a counter shaft 44b. This counter shaft 44b is connected through the reduction gear mechanism 44c to the output shaft 44d of a CVT shifting motor 44.

In the secondary sheave 42, on the other hand, a pressure regulating cam mechanism 42e is interposed between the output shaft 45 and the stationary sheave 42a. This pressure regulating cam mechanism 42e is similar to the pressure regulating cam mechanism 41e of the aforementioned primary sheave 41 and is composed of input and output side cams 42f and 42g, respectively, which have their individual opposed faces corrugated, and a roller 42h which is interposed between the opposed faces of those two cam 42f and 42g. Moreover, the input side cam 42f is splined to the stationary sheave 42a and abuts against the back face of the stationary sheave 42a through a spring at its face opposite the face contacting the roller 42h. On the other hand, the output side cam 42g is fixed on the output shaft 45 of the V-belt type continuously variable transmission 4.

At the back of the movable sheave 42b, there is arranged a ball screw device 42i, which is composed of an externally threaded portion 42j, an internally threaded portion 42k and a number of balls 42m, interposed between those threaded portions 42j and 42k. The externally threaded portion 42j is supported through an adjusting member 42n, a bearing 42o and an automatic centering mechanism 42p on an output gear 45a which is formed at the end of the output shaft 45. When the adjusting member 42n is turned to rotate the externally threaded portion 42j relatively to the internally threaded portion 42k, the initial tension of the belt 43 at the secondary sheave 42 and the widthwise center of the running motion of the belt are adjusted.

As a result, the transmission torque inputted from the primary sheave 41 to the secondary sheave 42 is transmitted to the input side cam 42f and is converted by the pressure regulating cam mechanism 42e into an axial force according to the magnitude of the transmission torque. This axial force is transmitted from the output side cam 42g to the movable sheave 42b through the output shaft 45, the output gear 45a, the automatic centering mechanism 42p, the bearing 42o, the adjusting member 42n, the externally threaded portion 42j of the ball screw device 42i, the internally threaded portion 42k of the ball screw device 42i, the automatic centering mechanism 41q and the bearing 42r. On the other hand, the reaction of this axial force is applied to the stationary sheave 42a through the input side cam 42f. These axial forces applied to the stationary sheave 42a and the movable sheave 42b coact as the clamping force of the belt 43 of the secondary sheave 42. As a result, this clamping force of the belt 43 has a magnitude according to the transmission torque inputted from the primary sheave 41.

On the other hand, the internally threaded portion 42k is supported on the back of the movable sheave 42b through the automatic centering mechanism 42q and the bearing 42r. Moreover, the internally threaded portion 42k has an end formed on its outer circumference with a gear 42s which meshes with a gear formed on the counter shaft 44b.

The rotations of the CVT shifting motor 44 are reduced by the reduction gear mechanism 44c and transmitted to the counter shaft 44b and further to the internally threaded portion 41k through a gear 44f. As a result, the internally threaded portion 41k is rotated relative to the externally threaded portion 41j. On the other hand, the reduced rotations transmitted from the CVT shifting motor 44 to the counter shaft 44b are transmitted to the gear 42s through another not-shown counter shaft. As a result, the internally threaded portion 42k is rotated relative to the externally threaded portion 42j. As a result of the relative rotations of those internally threaded portions 41k and 42k, the two movable sheaves 41b and 42b are axially moved through the ball screw devices 41i and 42i, respectively, between the underdrive side, as indicated by the solid lines, and the overdrive side, as indicated by the double-dotted lines, in synchronism with the stationary sheaves 41a and 42a so that the continuously variable shift is carried out.

As a result, the movable sheaves 41a and 42a of the two sheaves 41 and 42 are suitably connected to effect the automatic transmission controls according to a variety of running conditions by controlling the CVT shifting motor 44 in accordance with the various running conditions.

There is further provided a brake 49 for holding the CVT shifting motor 44. The CVT shifting motor 44 and brake 49 are operationally controlled on the basis of individual control signals coming from the electronic control unit 6. Moreover, the CVT shifting motor 44 is equipped with a motor r.p.m. detector 46 for outputting the r.p.m. $n_m$ of the CVT shifting motor 44 to the electronic control unit 6. Moreover, a primary sheave r.p.m. detector 47 and a secondary sheave r.p.m. detector 48 are individually connected with the electronic control unit 6 so that they detect the r.p.m. of the corresponding sheaves 41 and 42 to output their corresponding r.p.m. signals $n_p$ and $n_s$ to the electronic control unit 6.

The hydraulic control system 5 is equipped with a pump 51, a line pressure controller 52, a lockup controller 53, a speed selector 54 and a back pressure controller 55. The lockup controller 53 is actuated by a solenoid 56, which is turned on or off by a lockup control signal $P_l$ coming from the electronic control unit 6, to control the lockup clutch 21. The speed selector 54 controls the forward clutch 31 and the reverse brake 32. Back pressure controller 55 is actuated by a solenoid 57, which is turned on or off by a back pressure control signal $P_b$ coming from the electronic control unit 6, to control the back pressure of an accumulator for the forward clutch 31 and the reverse brake 32.

The pattern selector 7 is used to set an economy mode E or a power mode P selectively and to output its selection signal $P_s$ to the electronic control unit 6.

The shift lever 8 for the automatic transmission is equipped with a shift position detector 81. This shift position detector 81 detects the shift position of the shift lever 8 and outputs a detection signal s, to the electronic control unit 6.

Brake 9 is for braking the vehicle and is equipped with a brake detector 91. Brake detector 91 outputs its brake signal b, as an input to the electronic control unit 6.

A vehicle speed setter 645 and a deceleration rate setter 646 are used by means of a dial or push button so that they may set the vehicle speed and deceleration rate desired by the driver. These setters 645 and 646 output their respective set signals $v_s$ and $\alpha_s$ to the electronic control unit 6.

Thus, on the basis of the throttle opening signal $\theta$, the A/T oil temperature signal t, the engine r.p.m. signal $n_e$, the motor r.p.m. signal $n_m$, the primary sheave r.p.m. $n_p$, the secondary sheave r.p.m. signal $n_s$, the shift position signal s and the brake operation signal b, the electronic control unit 6 controls the hydraulic control system 6 and the CVT 4 by outputting the lockup pressure control signal $P_4$, the back pressure control signal $P_b$, a control signal m for controlling the CVT shifting motor 44, a motor holding brake signal $b_m$, the vehicle speed set signal $v_s$ and the deceleration rate set signal $\alpha_s$.

Figure 3A:
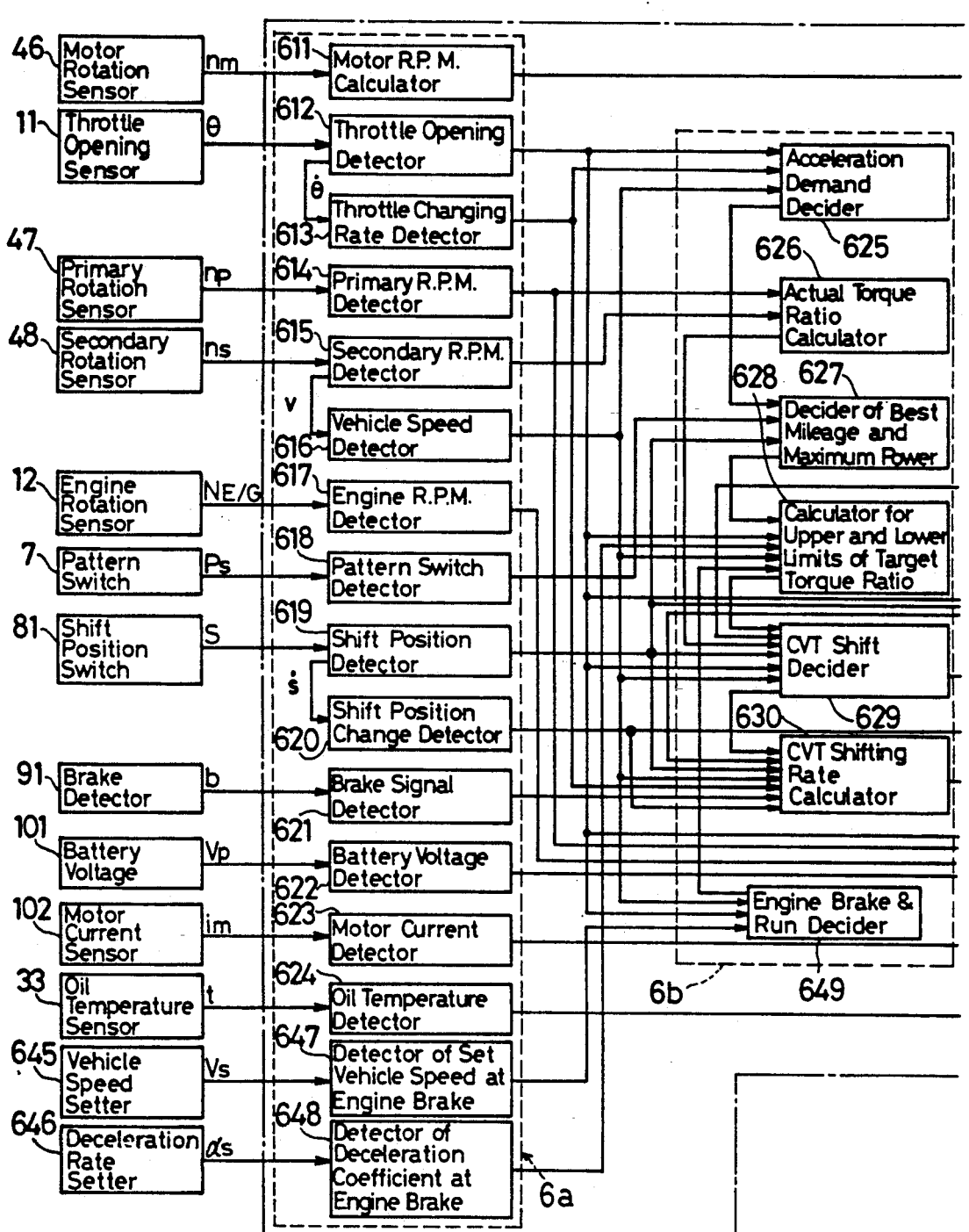
FIGS. 3(a) and 3(b) are a block diagram showing an electronic control unit appearing in FIG. 2.
Figure 3B:
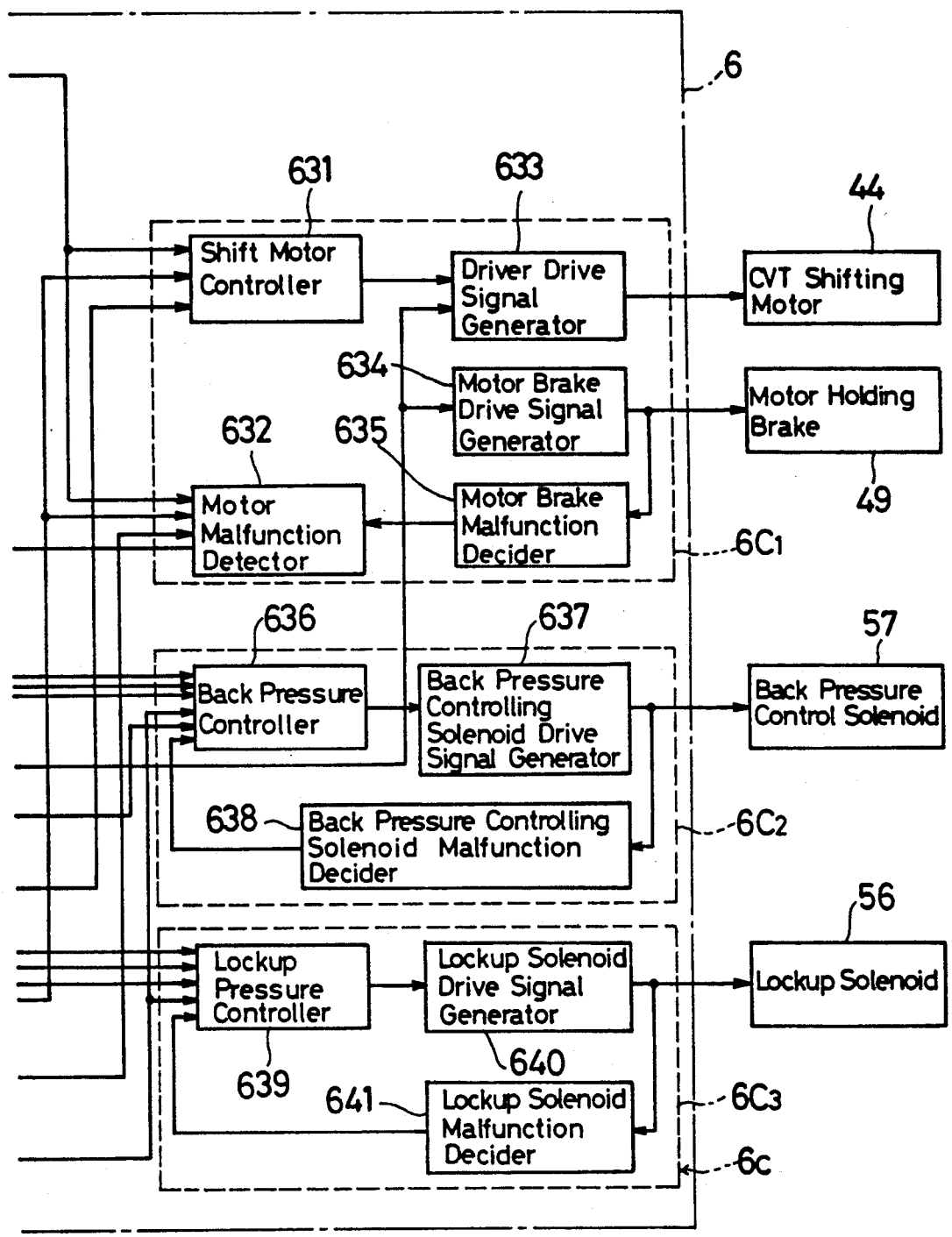

FIG. 3 is a block diagram showing the functions to be performed by the electronic control unit 6.

As shown in FIG. 3, the electronic control unit 6 is constructed of an input portion 6a, an arithmetic portion 6b and an output portion 6c.

The input portion 6a is composed of: a motor r.p.m. calculator 611 fed with the signal $n_m$ coming from the motor r.p.m. detector 46; a throttle opening detector 612 fed with the signal $\theta$ coming from the throttle opening detector 11; a throttle changing rate detector 613 for detecting a throttle changing rate $\dot{\theta}$ on the basis of the throttle opening $\theta$ inputted to the throttle opening detector 612 and by taking to account a software based timer valve; a primary sheave r.p.m. detector 614 fed with the signal $n_b$ coming from the primary sheave r.p.m. detector 47; a secondary sheave r.p.m. detector 615 fed with the signal $n_m$ coming from the secondary sheave r.p.m. detector 48; a vehicle speed detector 616 for detecting a vehicle speed v on the basis of the secondary sheave r.p.m. $n_s$ inputted to the secondary sheave r.p.m. detector 615; an engine r.p.m. detector 617 fed with the signal $n_e$ coming from the engine r.p.m.

detector 12; a pattern switch detector 618 fed with the signal $P_s$ dictating the economy mode E or power mode P and coming from the pattern selector 7; a shift position detector 619 fed with the signal s coming from the shift position detector 81; a shift position changing rate detector 620 for detecting the shift position changing rate $\dot{s}$ on the basis of the shift position s inputted to the shift position detector 619; a brake signal detector 621 fed with the brake operation signal b coming from the brake detector 91; a battery voltage detector 622 fed with a batter voltage signal $V_p$ coming from a battery voltage detector 101; a motor current detector 623 fed with a signal $1_m$ coming from a motor current detector 102; an oil temperature detector 624 fed with the signal t coming from the oil temperature detector 33; a detector 647 for detecting the set vehicle speed at the time of engine brake, which is fed with the signal $V_s$ coming from the vehicle speed setter 645; and a detector 648 for detecting the deceleration coefficient at the time of engine braking, which is to be fed with the signal $\alpha_s$ coming from the deceleration rate setter 648.

The arithmetic portion 6b is composed of an acceleration demand decider 625, an actual torque ratio calculator 626, a best mileage and maximum power decider 627, a calculator 628 for calculating the upper and lower ratios of the target torque ratio, a CVT shift decider 629, a CVT shifting rate calculator 630, and an engine brake run decider 649.

The output portion 6c is composed of a control signal output 6c for the CVT shifting motor 44, a back pressure control signal output $6c_2$ for the accumulator of the hydraulic control system 5 in the CVT 4, and a lockup control signal output $6c_3$.

The control signal output $6c$, of the CVT shifting motor 44 is comprised of a shifting motor controller 631, a motor malfunction detector 632, a driver drive signal generator 633, a motor brake drive signal generator 634, and a motor brake malfunction decider 635.

The back pressure control signal output $6c_3$ of the accumulator of the hydraulic control system 5 in the CVT 4 is comprised of a back pressure controller 636, a back pressure controlling solenoid drive signal generator 637, and a back pressure controlling solenoid malfunction decider 638.

The lockup control signal output $6c_2$ is comprised of a lockup pressure controller 639, a lockup solenoid drive signal generator 640, and a lockup solenoid malfunction decider 641.

The acceleration demand decider 625 is fed with the signals from the throttle opening detector 612, the throttle changing rate detector 613 and the vehicle speed detector 616 to decide, on the basis of these signals, whether or not an acceleration has been demanded, and outputs its decision result to the best mileage and maximum power decider 627.

The actual torque ratio calculator 626 is fed with a signal from the primary r.p.m. detector 614 and a signal from the secondary r.p.m. detector 615 to calculate the actual torque ratio on the basis of these signals and outputs its calculation result to the CVT shift decider 629.

The best mileage and maximum power decider 627 is fed with a signal from the acceleration demand decider 625, a signal from the pattern switch detector 618 and a signal from the shift position detector 619 to decide, on the basis of these signals, the control to be performed according to the best mileage characteristics or the maximum power characteristics, and outputs its decision result to the calculator 628 for calculating the upper end and lower limits of the target torque ratio.

The calculator 628 for calculating the upper and lower limits of the target torque ratio is fed with a signal from the best mileage and maximum power decider 627, a signal from the throttle opening detector 612, a signal from the vehicle speed detector 616, a signal from the engine brake deceleration coefficient detector 648, and a signal from the engine rake run decider 649, to calculate the upper and lower limits T.max and T.min of the target torque ratio on the basis of these signals to output its calculation result to the CVT shift decider 629.

This CVT shift decider 629 is fed with a signal from the calculator 628 for the upper and lower limits of a target torque ratio, the signal from the motor malfunction detector 632, a signal from the actual torque ratio calculator 626, a signal from the shift position detector 619, a signal from the throttle opening detector 612, and a signal from the vehicle speed detector 616 to decide, on the basis of these signals, whether or not the belt torque ratio of the CVT is to be changed, and then outputs its shift signal to the CVT shifting rate calculator 630, the driver drive signal generator 633 and the motor brake drive signal generator 634.

The CVT shifting rate calculator 630 is fed with a signal from the CVT shift decider 629, a signal from the shift position change detector 620, a signal from the shift position detector 619, a signal from the vehicle speed detector 616, a signal from the throttle changing rate detector 613, and a signal from the brake signal detector 621 to calculate, on the basis of these signals, the CVT shifting rate for realizing the demand at the present time, and outputs it to the shifting motor controller 631.

This shifting motor controller 631 is fed with a signal from the motor r.p.m. calculator 611, a signal from the battery voltage detector 622, and a signal from the CVT shifting rate calculator 630, to output a signal to the driver drive signal generator 633. In response to this signal, the rotational direction of the motor 44 and the voltage to be applied to the motor 44 are controlled so as to realize the shift of the CVT 4 demanded.

The motor malfunction detector 632 detects motor malfunctions such as the excess current of the motor 44, the saturation of the speed of the motor 44 or the locked state of the motor 44 on the basis of a signal from the motor r.p.m. calculator 611, the signal of the battery voltage detector 622, the signal of the motor current detector 623 and the signal of the motor brake malfunction decider 635, and outputs its detection signal to the CVT shift decider 629.

On the basis of a signal from the shift motor controller 631 and a signal from the CVT shift decider 629, the driver drive signal generator 633 generates a voltage signal to be fed to the motor driver and outputs it to the CVT shifting motor 44 in case a shift command is fed to the CVT shifting motor 44.

On the basis of the signal coming from the CVT shift decider 629, the motor brake drive signal generator 634 outputs a signal for releasing the motor holding brake 49 in case the shift command is fed to the CVT shifting motor 44. This releasing signal is also outputted to the motor brake malfunction decider 635.

On the basis of the signal coming from the motor brake drive signal generator 634, the motor brake malfunction decider 635 monitors the brake operation voltage to detect the malfunctions such as a disconnection or short-circuit, and outputs its detection signal to the motor malfunction detector 632.

On the basis of a signal from the throttle opening detector 612, a signal from the shift position detector 619, a signal from the shift position change detector 620, a signal from the oil temperature detector 624 and a signal from the back pressure controlling solenoid malfunction decider 638, the back pressure controller 636 outputs its control signal to the back pressure controlling solenoid drive signal generator 637 so as to control the shifting feed when shifting from neutral to drive, or neutral to reverse.

On the basis of the signal coming from the back pressure controller 536, the back pressure controlling solenoid drive signal generator 637 outputs a solenoid drive signal to not only the back pressure controlling solenoid 57 and but also the back pressure controlling solenoid malfunction decider 638.

On the basis of the signal coming from the back pressure controlling solenoid drive signal generator 637, the back pressure controlling solenoid malfunction decider 638 decides and detects malfunctions such as the disconnection or short-circuit of the back pressure controlling solenoid 57 and outputs its signal to the back pressure controller 636.

On the basis of a signal from the throttle opening detector 612, a signal from the primary r.p.m. detector 614, a signal from the engine r.p.m. detector 617, a signal from the oil temperature detector 624, and a signal from the lockup solenoid malfunction decider 641, the lockup pressure controller 639 decides between "on", "off" or "duty" for the lockup, and outputs the decision result to the lockup solenoid drive signal generator 640.

On the basis of the signal coming from the lockup pressure controller 639, the lockup solenoid drive signal generator 640 outputs its solenoid driving signal to not only the lock up solenoid 56 but also the lockup solenoid malfunction decider 641.

On the basis of the signal coming from the lockup solenoid drive signal generator 640, the lockup solenoid malfunction decider 641 decides and detects malfunctions such as the disconnection or short-circuit of the lockup solenoid 56 and outputs its signal to the lockup pressure control unit 639.

Figure 4:
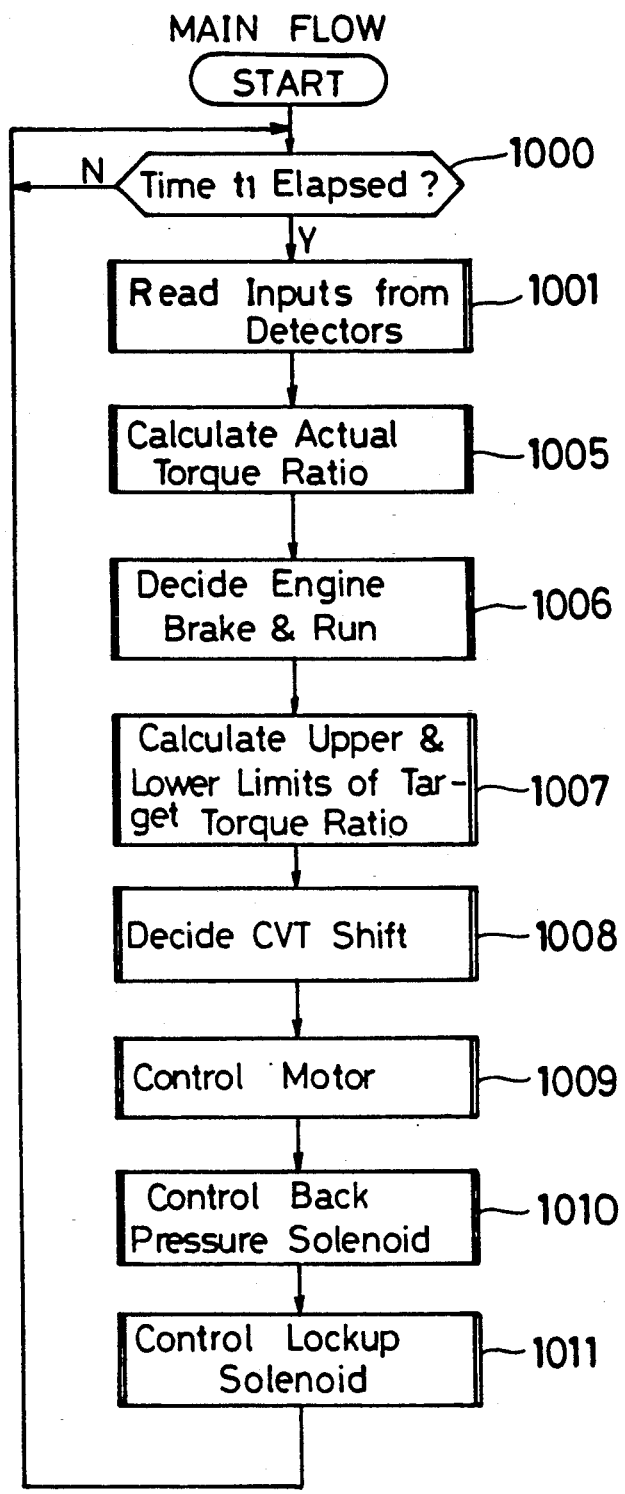
FIG. 4 is a chart for explaining the main flow of the routine of the electronic control unit.

Next, the control objectives of electronic control unit 6 will be described. FIG. 4 is a chart showing the main flow of the controls.

First of all, it is decided at Step 1000 whether or not a time $t_l$ has elapsed. After a lapse of time $t_l$, the control of the CVT is started. At Step 1001, the input data is read out from the individual detectors. Specifically, the signals of the individual detectors are read in as digital values so that they can be processed in the electronic control unit 6 by the input portion 6a. At Step 1005, the actual torque ratio is calculated. Specifically, the actual torque ratio (or belt ratio) $T_p$ is calculated from the primary r.p.m. $n_p$ and the secondary r.p.m. $n_s$ on the basis of the following formula:

$$T_p = n_p/n_s.$$

Next, at Step 1006, the engine brake run is decided according to the feature of the present invention.

Figure 5:
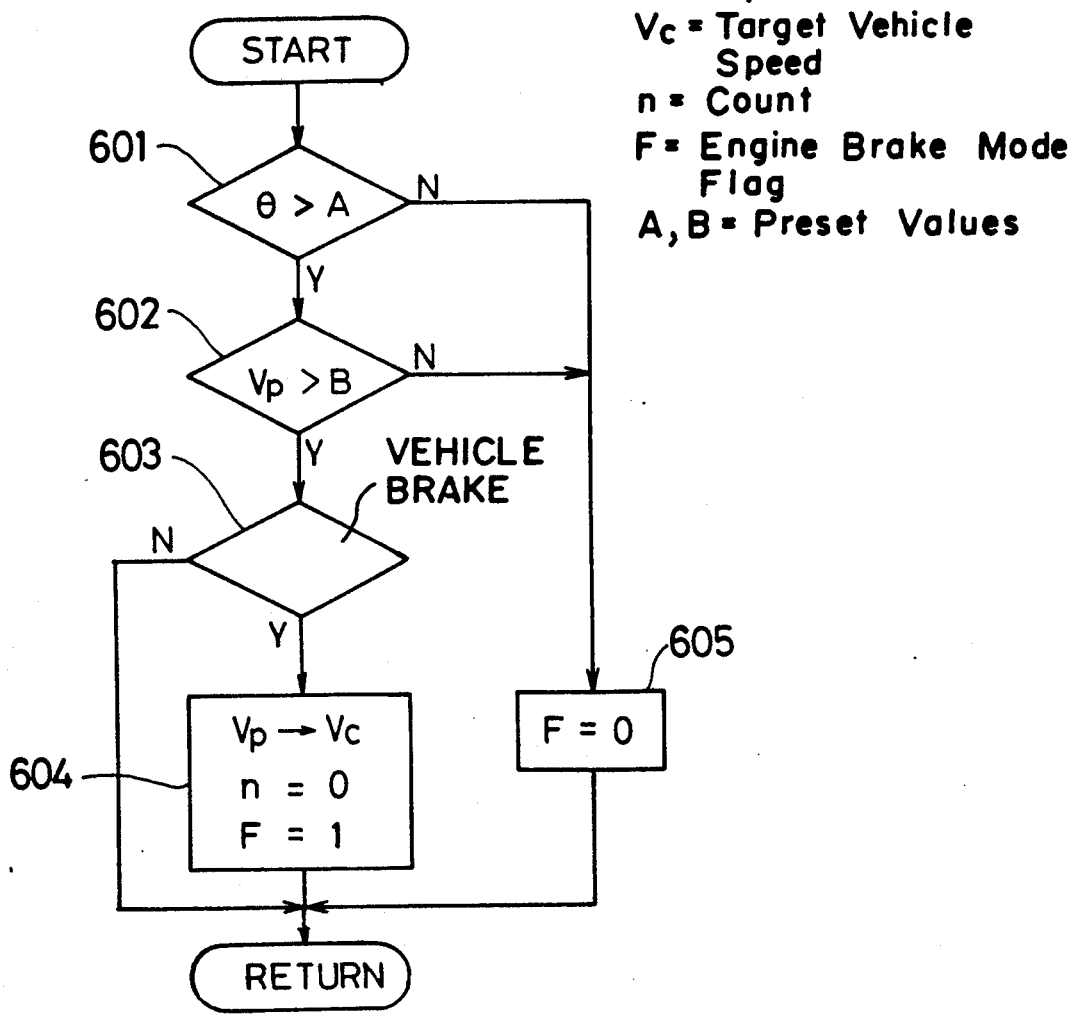
FIGS. 5, 6 and 7 are flow charts showing the individual embodiments of the decision routine for the engine braking mode.

FIG. 5 shows one embodiment of the routine for deciding the engine brake run.

If the throttle opening $\theta$ is lower than a preset value A at Step 601, if the present vehicle speed $V_p$ is larger than a preset value B at Step 602, and if the brake signal is issued at Step 603, then at Step 604: the present vehicle speed $V_p$ is stored as a target vehicle speed $V_o$ at the time of engine brake; and the counter n is set to 0; and the engine brake mode flag F is set to 1. If NO at Steps 601 and 602, the engine brake mode flag F is set to 0, and the routine is returned. If no brake signal at Step 603, on the other hand, the routine is returned to repeat the aforementioned procedures. At Step 1007, as will be described hereinafter, the upper and lower limits of the target torque ratio are calculated on the basis of the target vehicle speed $V_c$ at the aforementioned engine brake time.

Figure 6:
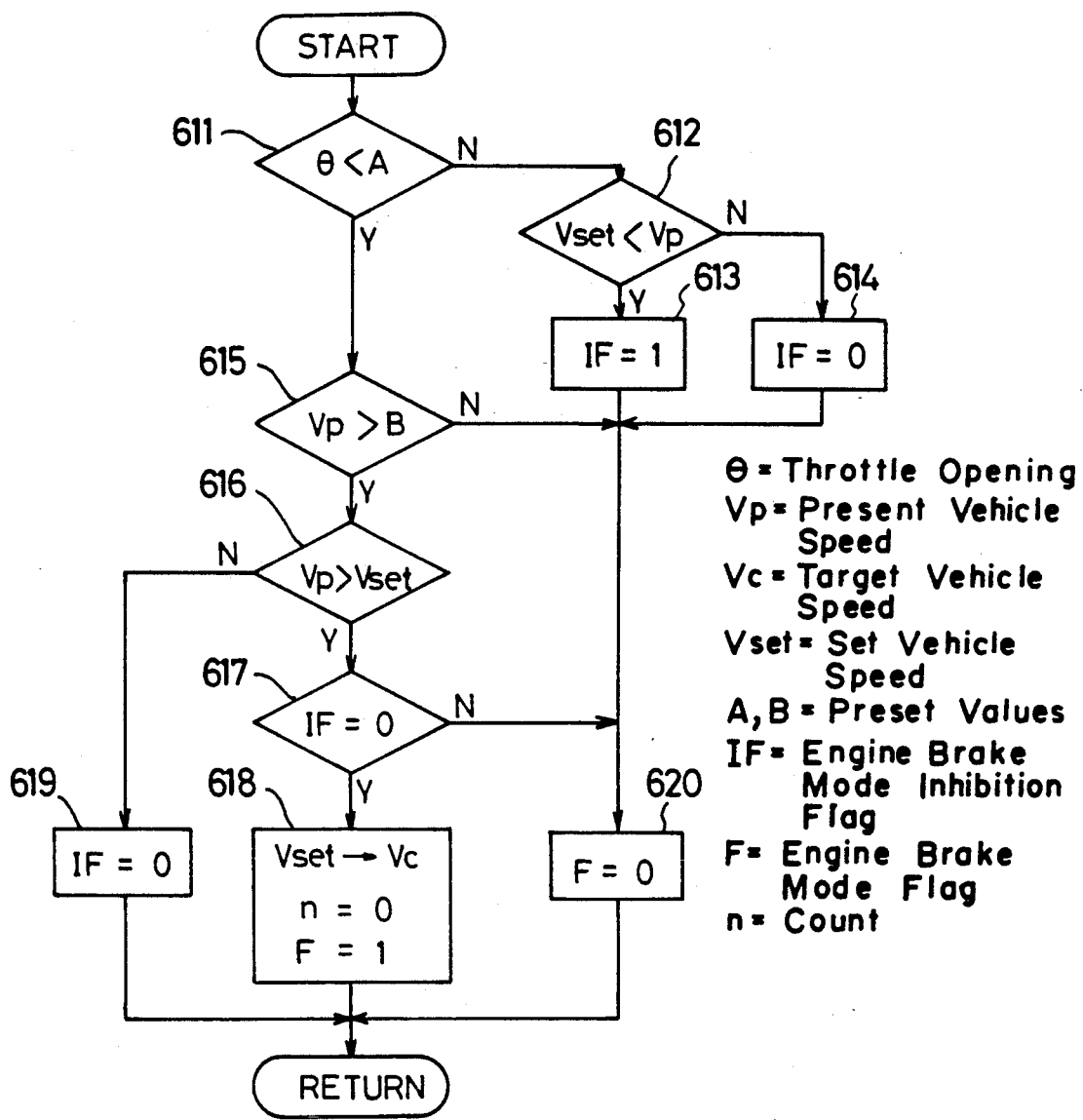

FIG. 6 shows another embodiment of the routine for deciding the engine brake run.

It is decided at Step 611 whether or not the throttle opening $\beta$ is lower than the preset value A. If the value $\beta$ is larger than A, it is decided at Step 612 whether or not the set vehicle speed $V_{set}$ by the vehicle speed setter 648 (as shown in FIG. 2) is smaller than the present vehicle speed $V_p$. If YES, an engine brake mode inhibition flag IF is set to 1. If NO, the flag IF is set to 0, and the engine brake mode flag F is set to 0 at Step 620 until the routine is returned.

If the throttle opening $\theta$ is smaller than the set value at Step 611, if the present vehicle speed $V_{set}$ is larger than the set value at Step 615 and also larger than the set vehicle speed $V_c$ at Step 616, and if the engine brake mode inhibition flag IF is at 0 at Step 617, then at Step 618: the set vehicle speed $V_{set}$ is stored as the target vehicle speed $V_c$ at the engine brake time; the counter n is set to 0; and the engine brake mode flag F is set to 1. If NO at Steps 616 and 617, the engine brake mode flag F is set to 0, and the routine is returned. If NO at Step 616, then the engine brake mode inhibition flag IF is set to 0, and the routine is returned.

In the present embodiment, the driver is enabled to set the target vehicle speed $V_c$ at the engine brake time to a value desired in advance by the driver, and the engine brake mode is not entered after the driver has accelerated to the preset speed $V_{set}$ or higher.

Figure 7:
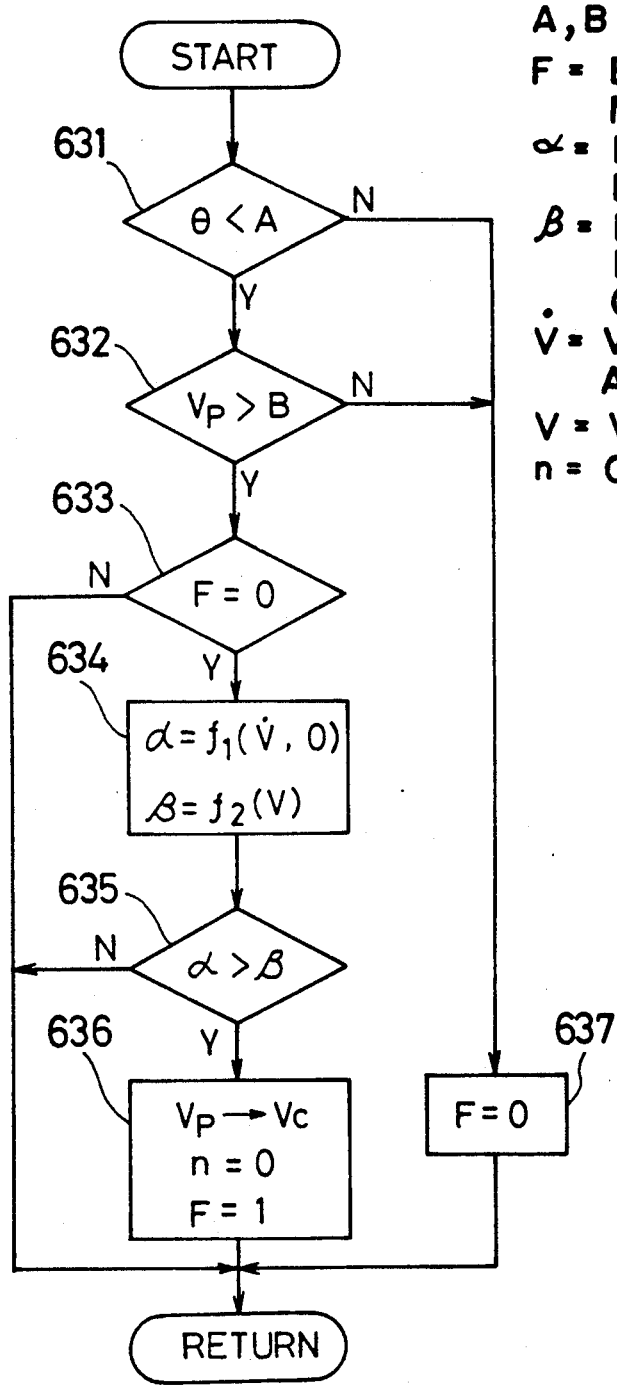

FIG. 7 shows still another embodiment of the routine for deciding the engine brake run.

If the throttle opening $\theta$ is smaller than the preset value A at Step 631; if the present vehicle speed $V_p$ is larger than the preset value B at Step 632; and if the engine brake mode flag F is at 0 at Step 633, then a vehicle speed acceleration state value $\alpha$ and an engine brake mode decision coefficient $\beta$ are calculated at Step 634. If the value $\alpha$ is larger than the value $\beta$ at Step 635, then, at Step 636: the present vehicle speed $V_p$ is stored as the target vehicle speed $V_c$ at the engine brake time; the counter n is set to 0; and the engine brake mode flag F is set to 1. If NO at Steps 631 and 632, the engine brake mode flag F is set to 0, and the routine is returned. If NO at Steps 633 and 635, on the contrary, the routine is returned, and the aforementioned procedures are repeated.

Figure 8A:
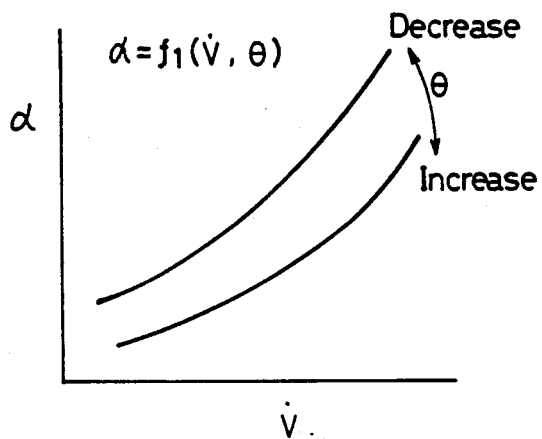
FIGS. 8(a) and 8(b) present diagrams for explaining a vehicle speed acceleration state value and a coefficient for deciding the engine braking mode.
Figure 8B:
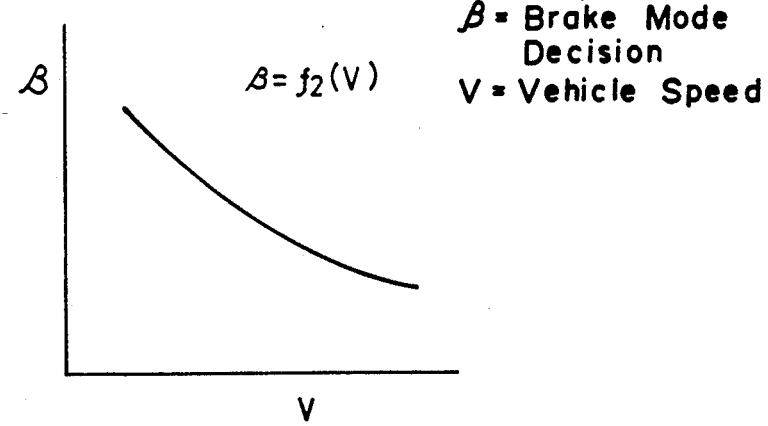

The aforementioned vehicle speed acceleration state value $\alpha$ represents the degree of demand for the engine brake and is calculated by a function $f_1$ which will increase with the increase of the vehicle acceleration $\dot{V}$ and with the decrease of the throttle opening $\theta$, as shown in FIG. 8(a). The engine brake mode decision coefficient $\beta$ is calculated from a function $f_2$ which will decrease with the increase in the vehicle speed $\dot{V}$, as shown in FIG. 8(b). If, at the throttle off time, for example, the vehicle acceleration is in an identical state for the vehicle speeds of 10 Km/h and 100 Km/h, the demand for the engine brake is greater because of safety concerns of the driver at the higher speed. The fact that the value α is equal for the states of the speeds of 10 Km/h and 100 Km/h means that the state of 100 Km/h is the steeper downhill.

Next, at Step 1007 (as shown in FIG. 4), the upper and lower limits of the target torque ratio are calculated. For these calculations, the upper and lower limits of the target r.p.m. are determined from the actual throttle opening $\theta$, the vehicle speed V and the present running mode $p_s$ (e.g., the power mode P or the economy mode E), and the upper and lower limits of the target torque ratio are calculated from those upper and lower limits of the target r.p.m. and the vehicle speed V.

As shown in FIG. 9, for example, it is decided at Step 701 whether or not the engine brake flag F is at 1. If NO, i.e., if the F is at 0, the upper limit $N^*_H$ and the lower limit $N^*_L$ of the target engine r.p.m. are calculated from the throttle opening $\theta$ at Step 706. Next, at Step 707, the upper limit $T^*_{max}$ of the target torque ratio and the lower limit $T^*_{min}$ of the target torque ratio are determined from the following formulas:

$$T^*_{max} = N^*_H \times K/V;$$

and $$T^*_{min} = N^*_L \times K/V,$$

wherein
K: a coefficient for calculating the secondary r.p.m. from the vehicle speed.

Figure 10A:
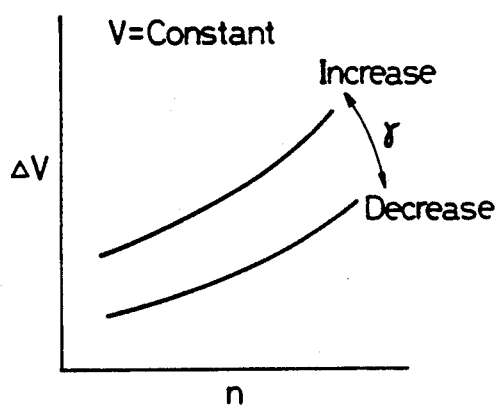
FIGS. 10(a) and 10(b) present diagrams for explaining the engine brake control value.
Figure 10B:
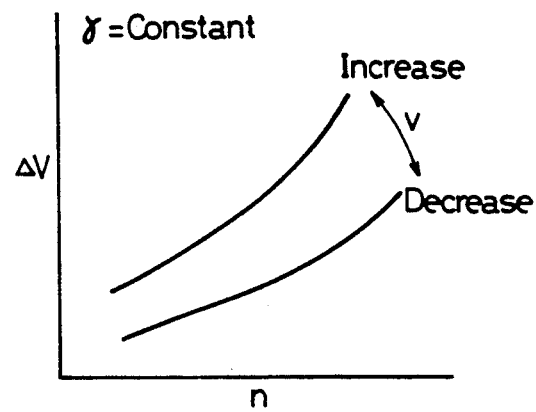

If the engine brake mode flag F is at 1 at Step 701, the counter n is incremented at Step 702, and the engine brake control value $\Delta V$ is calculated at Step 703. This value is calculated by the function f(n, $\gamma$, V) which is determined by the counter n (time), the vehicle speed V and the deceleration rate $\gamma$ which is set by the deceleration rate setter 646 (as shown in FIG. 2), as shown in FIG. 10. Next, at Step 704, the upper limit $V_H$ and the lower limit $V_L$ of the target vehicle speed are determined by the following formulas from the deceleration rate set value $\gamma$ and the target vehicle speed $V_o$ determined by the aforementioned engine brake run decision:

$$V_H = V_C - \Delta V + C;$$

and $$V_L = V_C - \Delta V + D,$$

wherein C and D: constants for hysteresis.

Next at Step 705, the upper target torque ratio limit $T^*_{max}$ and the lower target torque ratio limit $T^*_{min}$ are determined from the following formulas by using the actual engine r.p.m. $N_e$:

$$T^*_{max} = N_e \times K/V_L;$$

and $$T^*_{min} = N_e \times K/V_H.$$

Figure 11A:
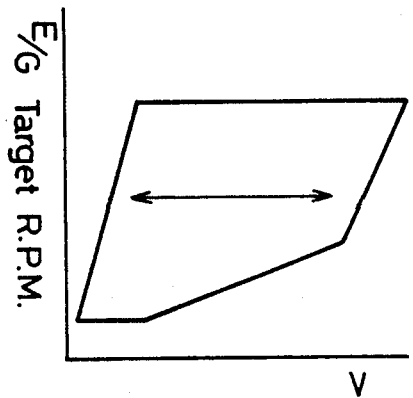
FIGS. 11(a) and 11(b) present diagrams for explaining the controls for the usual running mode and the engine braking mode.
Figure 11B:
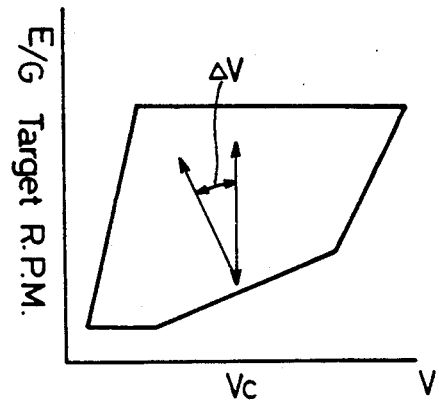

FIG. 11(a) shows the control in the ordinary running mode, and FIG. 11(b) shows the control in the engine brake mode. As shown, the braking rate by the engine is changed in accordance with the engine control value $\Delta V$ which is calculated by the deceleration rate set value $\gamma$.

Figure 12:
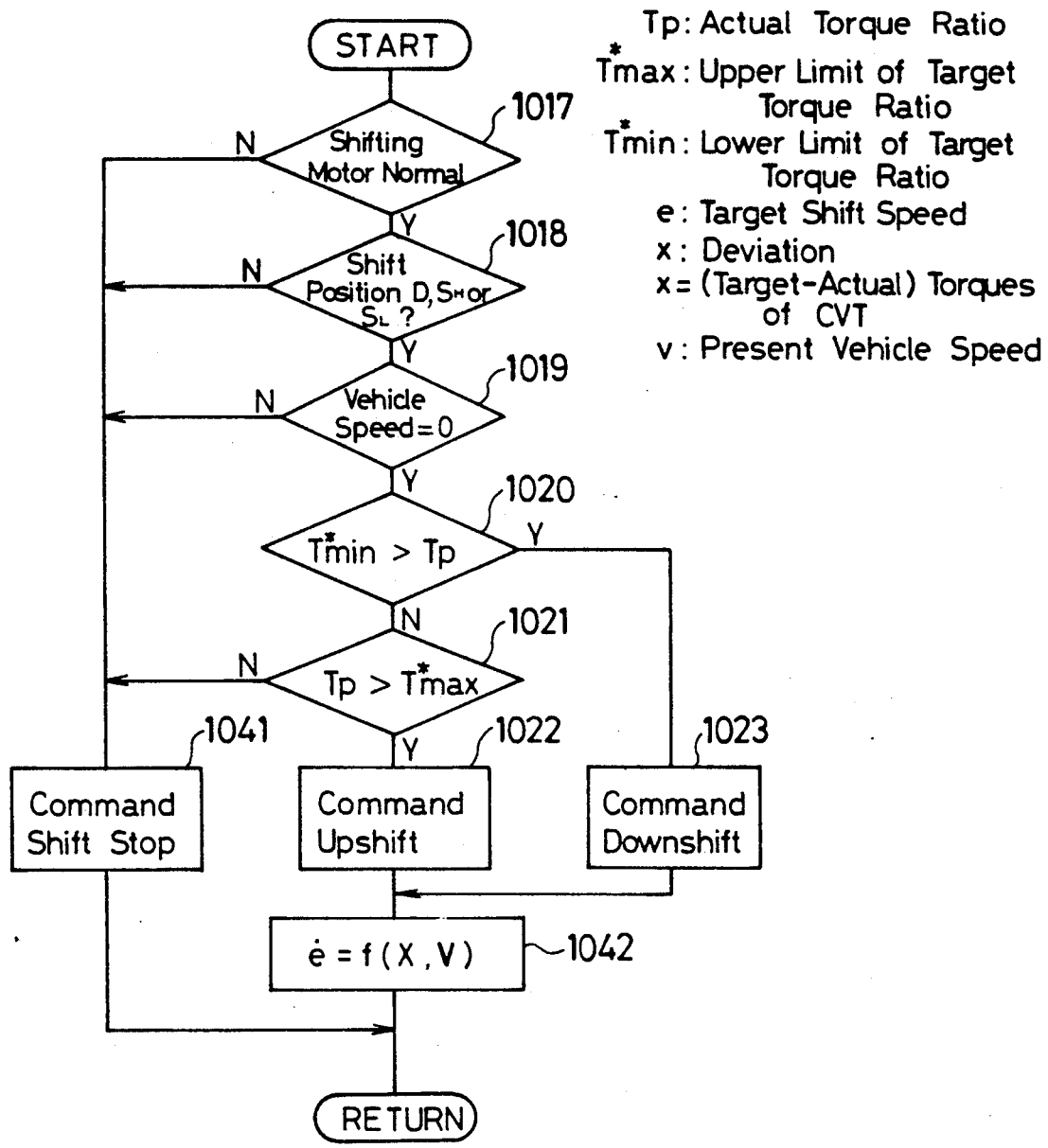
FIG. 12 is a flow chart showing the CVT shift decision routine.
Figure 13:
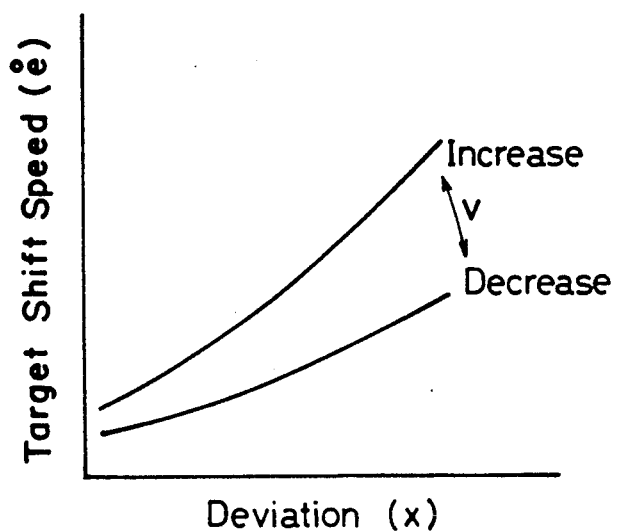
FIG. 13 is a diagram for explaining the target shift speed.

Next, as shown in FIG. 4, the CVT shift decision is performed at Step 1008. How fast the shift is to be accomplished for the upshift or downshift is decided from the actual torque ratio, the target torque ratio, the vehicle speed, the shift position, and the states of the brake, the CVT motor 44 and the holding brake 45. This CVT shift decision is executed in accordance with the flow shown in FIG. 12. Specifically, it is decided at Step 1017 whether or not the CVT shifting motor 44 is normal. If YES, it is decided at Step 1018 whether or not the shift position taken is in D, $S_H$ or $S_L$. If any of these shift positions D, $S_H$ and $S_L$ is taken, it is decided at Step 1019 whether or not the vehicle speed is at 0. If the vehicle speed is not at 0, it is decided at Step 1020 whether or not the actual torque ratio $T_p$ is smaller than the lower target torque ratio limit $T^*_{min}$. If the actual torque ratio $T_p$ is not smaller than the lower target torque ratio limit $T^*_{min}$, it is decided at Step 1021 whether or not the actual torque ratio $T_p$ is larger than the upper target torque ratio limit $T^*_{max}$. If the actual torque ratio $T_p$ is larger than the upper target torque ratio limit $T^*_{max}$, the shifting direction is commanded to the upshift at Step 1022. If the actual torque ratio $T_p$ is smaller at Step 1020 than the lower target torque ratio limit $T^*_{min}$, the shifting direction is commanded to the down shift at Step 1023. After either the upshift command at Step 1022 or the downshift command at Step 1023, the target shifting rate ė is calculated at Step 1042. This target shifting rate ė is expressed, as shown in FIG. 13, by a function {ė=f(x, V)} of the deviation x between the target and actual torque ratios and the present vehicle speed V. In short, the target shifting rate ė is set from deviation x and the vehicle speed V.

If all the individual decisions are NO at Steps 1017 to 1019 and 1022, the shift stop is commanded at Step 1041, and no shift is performed in this case.

Figure 14:
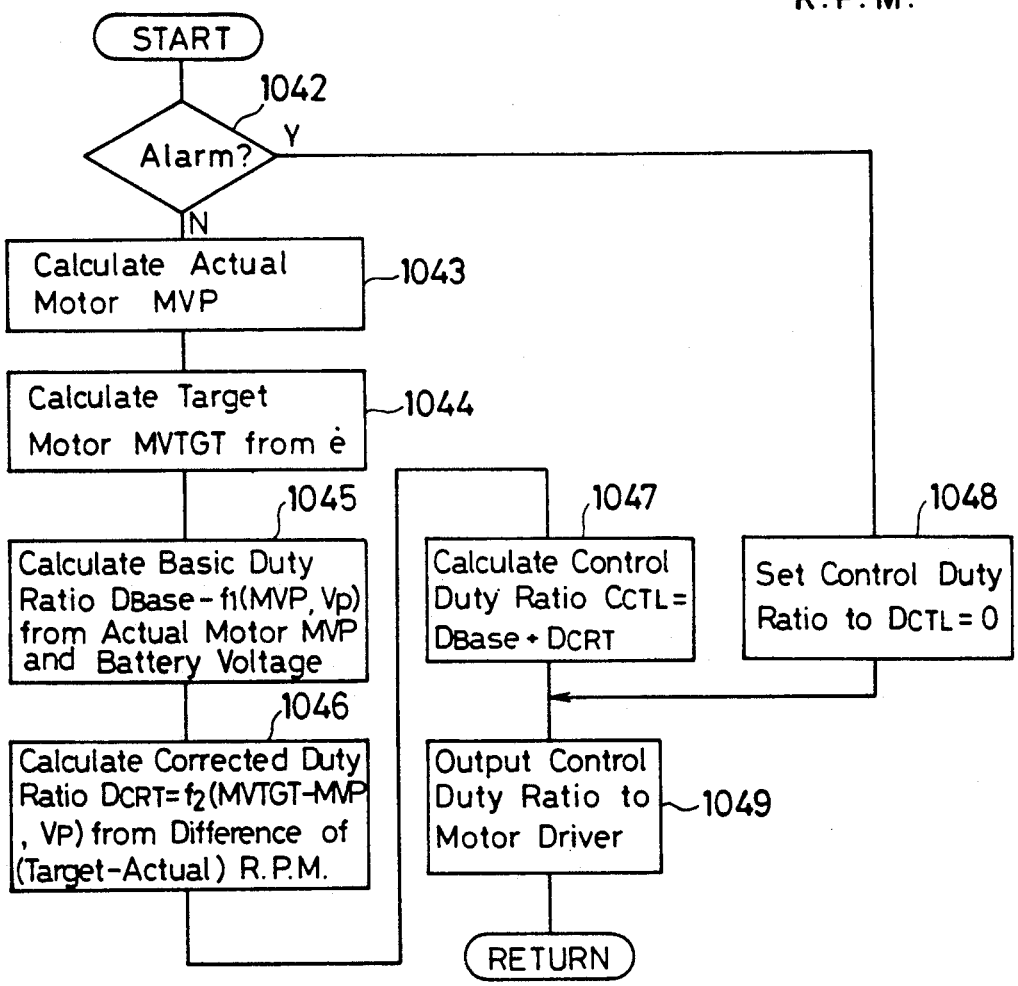
FIG. 14 is a flow chart showing the motor control routine.
Figure 15:
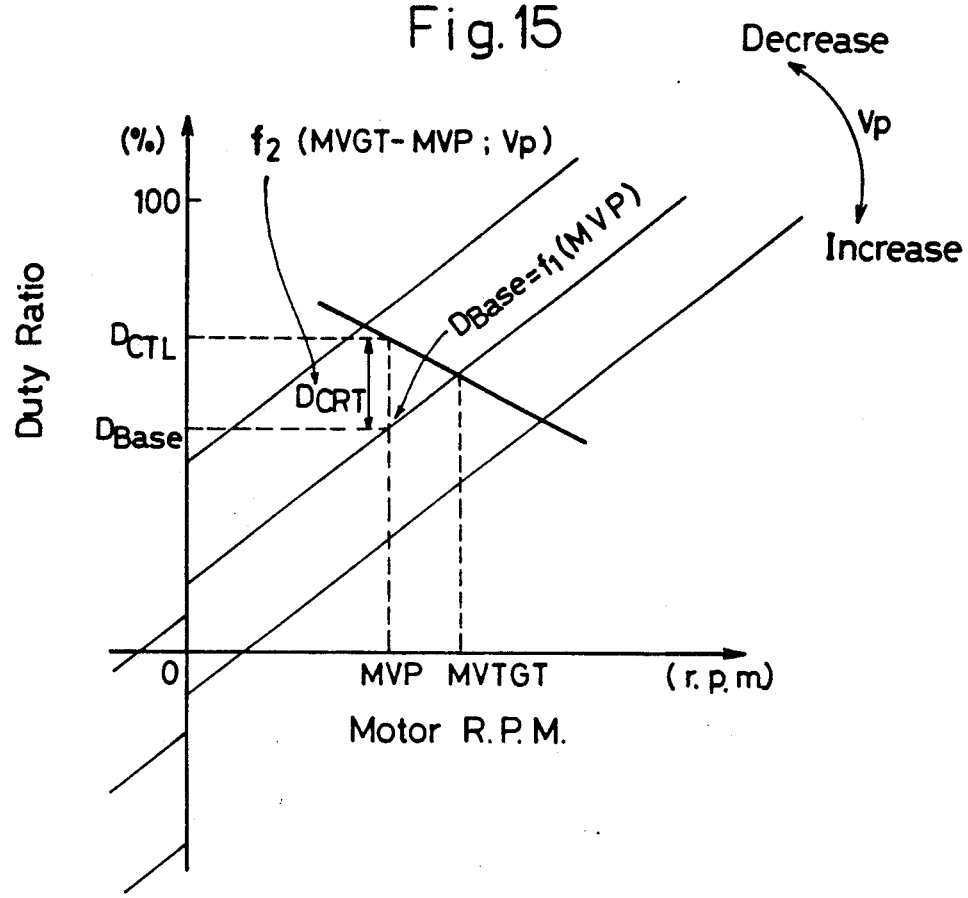
FIG. 15 is a diagram showing the relation between the motor r.p.m. and the duty ratio.
Figure 16:
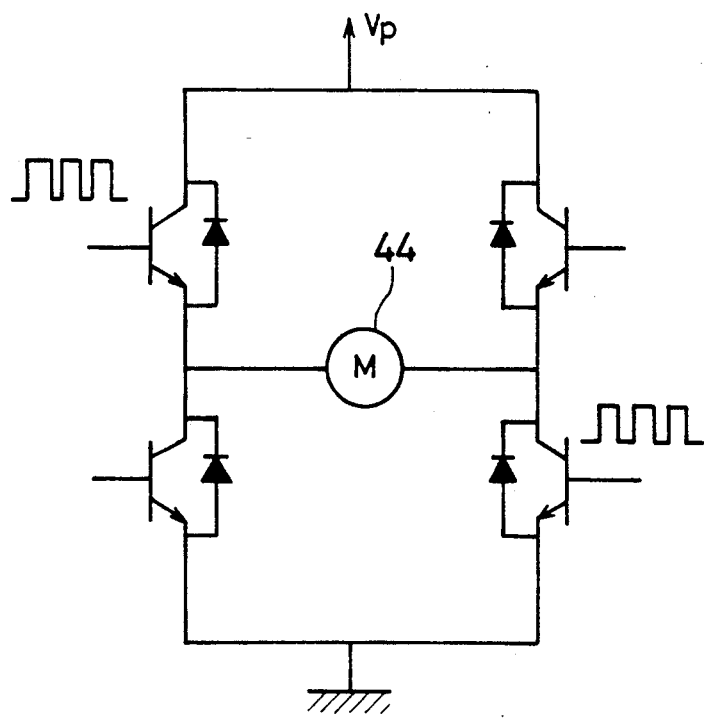
FIG. 16 is a diagram showing a motor driver circuit.

Next, the motor is controlled at Step 1000 of FIG. 4. Specifically, the motor drive signal is controlled on the basis of the present motor r.p.m. and the battery voltage so as to realize the shifting rate which is calculated by the CVT shift decision. In the flow chart shown in FIG. 14, it is decided at first at Step 1042 whether or not the CVT transmission is alarmed. If NO, the actual motor r.p.m. MVP is calculated at Step 1043. Next, at Step 1044, the target motor r.p.m. MVTGT is calculated from the shifting rate e and the actual torque ratio $T_P$. At Step 1045, moreover, the basic duty ratio $D_{BASE} = \{f_1(MVP, V_p)\}$ is calculated from the actual motor r.p.m. and the actual battery voltage. Next, at Step 1046, the corrected duty ratio $D_{CRT} = \{f_2(MVTGT - MVP, V_p)\}$ is calculated from the difference between the target r.p.m. and the actual r.p.m. Then, the control duty ratio $D_{CTL} = (D_{BASE} + D_{CRT})$ is calculated from $D_{BASE}$ and $D_{CRT}$. In this case, the relations between the motor r.p.m. and the duty ratio shown in FIG. 15 are used for calculating the individual duty ratios. If alarmed at Step 1042, on the contrary, the control duty ratio $D_{CTL}$ is set to 0 at Step 1048. Finally, at Step 1049, the control duty ratio is outputted to the motor driver circuit shown in FIG. 16, to drive and control the motor 44.

Next, at Step 1010 of FIG. 4, the back pressure solenoid is controlled. Specifically, the back pressure of the accumulator is controlled on the basis of the throttle opening $\theta$, the shift position and the oil temperature.

Finally, at Step 1011, the lockup solenoid is controlled. Specifically, the lockup pressure solenoid 56 is controlled on the basis of the primary r.p.m. $n_P$, the engine r.p.m. $N_e$, the throttle opening $\theta$ and the oil temperature t.

We claim:

1. In a continuously variable transmission for a vehicle, the transmission having an input shaft and an output shaft and means for continuously varying and transmitting the revolutions of an engine to wheels by changing the torque ratio between the input shaft and the output shaft, a control system of the continuously variable transmission comprising:

vehicle speed detecting means for detecting the running speed of the vehicle;

throttle opening detector means for detecting a throttle opening of the engine, said throttle opening being commanded by a driver of the vehicle;

brake signal detecting means for detecting a brake signal of the vehicle;

engine brake control means for setting an engine brake control value for the vehicle to a value based on the throttle opening and the vehicle running speed;

means for setting a target speed for the vehicle at a target value determinedly based on the present vehicle running speed when said detected vehicle running speed is higher than a first preset value, said throttle opening is lower than a second preset value, and said brake signal is absent;

said means for setting the target speed of the vehicle setting said target value determinedly based on the present vehicle running speed and said engine brake control value when said vehicle running speed is higher than the first preset value, said throttle opening is lower than the second preset value, and said brake signal is detected; and torque ratio control means for controlling the torque ratio between the input shaft and the output shaft of said continuously variable transmission, in accordance with said target value and said throttle opening.

2. A control system according to claim 1, further comprising: deceleration rate setting means, operable by a driver, for setting a deceleration rate for the vehicle; said engine brake control means further setting said engine brake control value for the vehicle in accordance with said deceleration rate.

* * * * *

UNITED STATES PATENT AND TRADEMARK OFFICE
CERTIFICATE OF CORRECTION

PATENT NO. : 5,257,188
DATED : October 26, 1993
INVENTOR(S) : SAKAKIBARA et al

It is certified that error appears in the above-indentified patent and that said Letters Patent is hereby corrected as shown below:

Column 2, line 55, delete "6" (first instance) and insert --5--;

line 67, delete "5" and insert --6--.

Column 3, line 23, delete "106" and insert --105--;

line 43, after "41d" insert --movable--;

line 54, delete "36" and insert --35--; and line 60, delete "36" and insert --35--.

Column 4, line 1, delete "and so on, - - -, and so on"; and line 53, delete "cam" and insert --cams--.

Column 5, line 2, delete "relatively" and insert --relative--.

UNITED STATES PATENT AND TRADEMARK OFFICE
CERTIFICATE OF CORRECTION

PATENT NO. : 5,257,188
DATED : October 26, 1993
INVENTOR(S) : SAKAKIBARA et al

It is certified that error appears in the above-indentified patent and that said Letters Patent is hereby corrected as shown below:

Column 6, line 41, delete "6" (second instance) and insert --5--;

line 43, delete "$P_4$" and insert --$P_t$--;

line 61, delete "$n_b$" and insert --$n_p$--; and

Column 7, line 30, delete "6c" and insert --$6c_1$--; and line 34, delete "6c" and insert --$6c_1$--.

Column 8, line 2, delete "end".

Column 9, line 14, delete "536" and insert --636--.

UNITED STATES PATENT AND TRADEMARK OFFICE
CERTIFICATE OF CORRECTION

PATENT NO. : 5,257,188  
DATED : October 26, 1993  
INVENTOR(S) : SAKAKIBARA et al Page 3 of 4

It is certified that error appears in the above-indentified patent and that said Letters Patent is hereby corrected as shown below:

Column 10, line 16, delete "ß" and insert "θ";

line 17, delete "ß" and insert "θ";

line 32, delete "616" and insert --615--.

line 66, delete ""V" and insert --V--.

UNITED STATES PATENT AND TRADEMARK OFFICE
CERTIFICATE OF CORRECTION

PATENT NO. : 5,257,188

DATED : October 26, 1993

INVENTOR(S) : SAKAKIBARA et al

It is certified that error appears in the above-indentified patent and that said Letters Patent is hereby corrected as shown below:

Column 12, line 37, delete "1022" and insert --1021--.
          line 39, delete "1000" and insert --1009--; and
          line 49, delete "e" and insert --e--.

Signed and Sealed this

Sixth Day of September, 1994

Attest:

BRUCE LEHMAN

Attesting Officer     Commissioner of Patents and Trademarks